United States Patent
Godin et al.

(10) Patent No.: US 12,015,948 B2
(45) Date of Patent: Jun. 18, 2024

(54) SMALL DATA TRANSMISSION ROUTING

(71) Applicant: Nokia Technologies Oy, Espoo (FI)

(72) Inventors: Philippe Godin, Versailles (FR); Subramanya Chandrashekar, Bangalore (IN); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 214 days.

(21) Appl. No.: 17/485,975

(22) Filed: Sep. 27, 2021

(65) Prior Publication Data

US 2022/0124555 A1    Apr. 21, 2022

(30) Foreign Application Priority Data

Oct. 15, 2020  (IN) .............................. 202041044950

(51) Int. Cl.
*H04W 28/06*       (2009.01)
*H04L 12/46*       (2006.01)

(52) U.S. Cl.
CPC ......... *H04W 28/06* (2013.01); *H04L 12/4633* (2013.01)

(58) Field of Classification Search
CPC .. H04L 12/4633; H04W 28/06; H04W 76/12; H04W 76/27; H04W 76/20
See application file for complete search history.

(56) References Cited

U.S. PATENT DOCUMENTS

| 2020/0137564 A1 | 4/2020 | Liu et al. |
| 2021/0176802 A1* | 6/2021 | Sirotkin ................. H04L 1/1864 |
| 2023/0164628 A1* | 5/2023 | Zou ................... H04W 28/0864 370/329 |

FOREIGN PATENT DOCUMENTS

| CN | 110139387 A | 8/2019 |
| WO | 2020/191059 A1 | 9/2020 |

OTHER PUBLICATIONS

Extended European Search Report received for corresponding European Patent Application No. 21198378.8, dated Mar. 16, 2022, 15 pages.

(Continued)

*Primary Examiner* — Mansour Oveissi
(74) *Attorney, Agent, or Firm* — SQUIRE PATTON BOGGS (US) LLP (57) ABSTRACT

Systems, methods, apparatuses, and computer program products for inter-gNB small data transmission (SDT) routing at a radio access network (RAN). A method may include transmitting an initial request message from a first element in a first network node, to a second element in the first network node to obtain context information. The method may also include receiving, at the first element, a context setup request message based on the context information containing a transport layer information of a third element of a second network node and context information of a user equipment in the second network node. The method may further include processing a data packet according to the received context information. In addition, the method may include forwarding the data packet to the third element of the second network node according to the received transport layer information.

20 Claims, 7 Drawing Sheets

(56) References Cited

OTHER PUBLICATIONS

"3rd Generation Partnership Project; Technical Specification Group Radio Access Network; NG-RAN; Architecture description (Release 16)", 3GPP TS 38.401, V16.2.0, Jul. 2020, pp. 1-77.

"3rd Generation Partnership Project; Technical Specification Group Radio Access Network; NG-RAN; E1 Application Protocol (E1AP) (Release 16)", 3GPP TS 38.463, V16.2.0, Jul. 2020, pp. 1-230.

"3rd Generation Partnership Project; Technical Specification Group Radio Access Network; NG-RAN; F1 application protocol (F1AP) (Release 16)", 3GPP TS 38.473, V16.2.0, Jul. 2020, pp. 1-363.

"3rd Generation Partnership Project; Technical Specification Group Services and System Aspects; Security architecture and procedures for 5G system (Release 16)", 3GPP TS 33.501, V16.4.0, Sep. 2020, pp. 1-250.

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.

"SDT mechanism on RRC/non-RRC based approaches and RACH requirements", 3GPP TSG RAN WG2 Meeting #111-e, R2-2006713, Agenda: 8.6.2, Intel Corporation, Aug. 17-28, 2020, 10 pages.

"Radio bearer configuration for SDT considering UE context relocation and CU/DU split", 3GPP TSG RAN WG2 Meeting #111-e, R2-2006714, Agenda: 8.6.2, Intel Corporation, Aug. 17-28, 2020, 6 pages.

* cited by examiner

SMALL DATA TRANSMISSION ROUTING

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for inter-gNB small data transmission (SDT) routing at a radio access network (RAN).

BACKGROUND

Examples of mobile or wireless telecommunication systems may include the Universal Mobile Telecommunications System (UMTS) Terrestrial Radio Access Network (UTRAN), Long Tenn Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bit rates on the order of 10-20 Gbit/s or higher, and will support at least enhanced mobile broadband (eMBB) and ultra-reliable low-latency communications (URLLC) as well as massive machine type communications (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Various aspects of examples of the invention are set out in the claims.

According to a first aspect of the present invention, a method comprising: transmitting an initial request message from a first element in a first network node, to a second element in the first network node to obtain context information; receiving, at the first element from the second element, a context setup request message comprising a transport layer information of a third element of a second network node and context information of a user equipment stored in the second network node; processing a data packet according to the received context information; and forwarding the data packet to the third element of the second network node according to the received transport layer information.

According to a second aspect of the present invention, an apparatus comprising: at least one processor; and at least one memory including computer program code, wherein the at least one memory and the computer program code are configured, with the at least one processor, to cause the apparatus to at least: transmit an initial request message from a first element in the apparatus, to a second element in the apparatus to obtain context information; receive, at the first element from the second element, a context setup request message comprising a transport layer information of a third element of a second network node and context information of a user equipment stored in the second network node; processing a data packet according to the received context information; and forwarding the data packet to the third element of the second network node according to the received transport layer information.

According to a third aspect of the present invention, a non-transitory computer storage medium encoded with a computer program, the program comprising instructions that when executed by one or more computers cause the one or more computers to perform operations comprising: transmitting an initial request message from a first element in a first network node, to a second element in the first network node to obtain context information; receiving, at the first element from the second element, a context setup request message comprising a transport layer information of a third element of a second network node and context information of a user equipment stored in the second network node; processing a data packet according to the received context information; and forwarding the data packet to the third element of the second network node according to the received transport layer information.

According to a fourth aspect of the present invention, an apparatus comprising: means for transmitting an initial request message from a first element in the apparatus, to a second element in the apparatus to obtain context information; means for receiving, at the first element from the second element, a context setup request message comprising a transport layer information of a third element of a second network node and context information of a user equipment stored in the second network node; processing a data packet according to the received context information; and forwarding the data packet to the third element of the second network node according to the received transport layer information.

According to a fifth aspect of the present invention, a method comprising: receiving, by a second network node, a retrieve user equipment context request message from a second element of a first network node; send a response message comprising a context information of a user equipment stored in the second network node and a transport layer information of a third element of the second network node, to enable the user equipment to send one or more data packets to the second network node based on the context information and the transport layer information; and receive one or more data packets from the user equipment.

According to a sixth aspect of the present invention, an apparatus comprising: at least one processor; and at least one memory including computer program code, wherein the at least one memory and the computer program code are configured, with the at least one processor, to cause the apparatus to at least: receive a retrieve user equipment context request message from a second element of a first network node; send a response message comprising a context information of a user equipment stored in the apparatus and a transport layer information of a third element of the apparatus, to enable the user equipment to send one or more data packets to the apparatus based on the context information and the transport layer information; and receive one or more data packets from the user equipment.

According to a seventh aspect of the present invention, a non-transitory computer storage medium encoded with a computer program, the program comprising instructions that when executed by one or more computers cause the one or more computers to perform operations comprising: receiving, by a second network node, a retrieve user equipment context request message from a second element of a first network node; send a response message comprising a context information of a user equipment stored in the second network node and a transport layer information of a third element of the second network node, to enable the user equipment to send one or more data packets to the second network node based on the context information and the transport layer information; and receive one or more data packets from the user equipment.

According to an eighth aspect of the present invention, an apparatus comprising: means for receiving a retrieve user equipment context request message from a second element of a first network node; means for sending a response message comprising a context information of a user equipment stored in the apparatus and a transport layer information of a third element of the apparatus, to enable the user equipment to send one or more data packets to the apparatus based on the context information and the transport layer information; and means for receiving one or more data packets from the user equipment.

According to a nineth aspect of the present invention, a method comprising: receiving an initial request message for context information from a first element in a first network node; sending a retrieve user equipment context request message to a second network node based on the initial request message; receiving at least one of a context information stored in the second network node and a transport layer information of a third element of the second network node from the second network node in a response to the retrieve user equipment context request message; and triggering the first element to forward a data packet by transmitting a context setup request message to the first element.

According to a tenth aspect of the present invention, an apparatus comprising: at least one processor; and at least one memory including computer program code, wherein the at least one memory and the computer program code are configured, with the at least one processor, to cause the apparatus to at least: receive an initial request message for context information from a first element in the apparatus; send a retrieve user equipment context request message to a second network node based on the initial request message; receive at least one of a context information stored in the second network node and a transport layer information of a third element of the second network node from the second network node in a response to the retrieve user equipment context request message; and trigger the first element to forward a data packet by transmitting a context setup request message to the first element.

According to an eleventh aspect of the present invention, a non-transitory computer storage medium encoded with a computer program, the program comprising instructions that when executed by one or more computers cause the one or more computers to perform operations comprising: receiving an initial request message for context information from a first element in a first network node; sending a retrieve user equipment context request message to a second network node based on the initial request message; receiving at least one of a context information stored in the second network node and a transport layer information of a third element of the second network node from the second network node in a response to the retrieve user equipment context request message; and triggering the first element to forward a data packet by transmitting a context setup request message to the first element.

According to a twelfth aspect of the present invention, an apparatus comprising: means for receiving an initial request message for context information from a first element in the apparatus; means for sending a retrieve user equipment context request message to a second network node based on the initial request message; means for receiving at least one of a context information stored in the second network node and a transport layer information of a third element of the second network node from the second network node in a response to the retrieve user equipment context request message; and means for triggering the first element to forward a data packet by transmitting a context setup request message to the first element.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for inter-gNB small data transmission (SDT) routing at a radio access network (RAN).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

3$^{rd}$ Generation Partnership Project (3GPP) describes that an inactive-radio network temporary identifier (I-RNTI) may be allocated by the last serving 5G nodeB (gNB) (e.g., anchor gNB) to a user equipment (UE) that is being moved to a radio resource control protocol (RRC) inactive state. Further, the I-RNTI may be configured as part of an RRC release message with a SuspendConfiguration, and the UE may transmit the I-RNTI within a RRC resume request message. The I-RNTI (40 bits) may also be mandated to include means to identify both the UE and the last serving gNB. As such, the I-RNTI may include a UE ID part and a gNB ID part.

According to 3GPP, an algorithm may be used to construct the I-RNTI, which may be specific to a vendor. In particular, the algorithm may include a decision on the position within the I-RNTI and number of bits used for the UE ID and the gNB ID parts. However, 3GPP does not specify the number of bits that should be used to identify the gNB, and the number of bits that should be used to identify the UE within a total of I-RNTI bits. 3GPP also does not specify the position of the UE ID and the anchor gNB ID parts within the I-RNTI.

Additionally, 3GPP describes that UE mobility may be tracked if the I-RNTI over the air is intercepted. This is because the RRC resume request message sent by the UE to the network to resume its connection, including the I-RNTI, is sent on a common control channel (CCCH) that is not secured. Thus, to avoid UE trackability, 3GPP describes that the UE ID part of the I-RNTI assigned by the network can be different in consecutive suspends of the same UE.

Figure 1A:
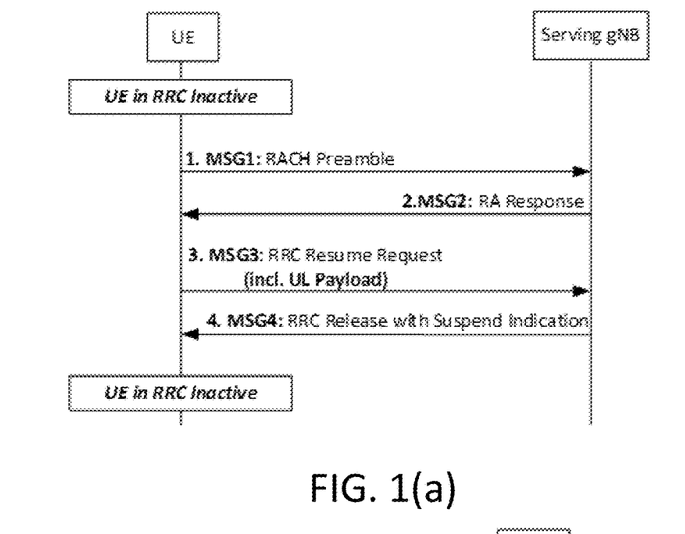
FIG. 1(a) illustrates an example of a 4-step based small data transmission (SDT) signaling diagram.

FIG. 1(a) illustrates an example of a 4-step based small data transmission (SDT) signaling diagram. Further, FIG. 1(b) illustrates an example of a 2-step based SDT signaling diagram, and FIG. 1(c) illustrates an example of a configured grant (CG) based SDT signaling diagram. 3GPP describes various solutions for enabling SDT of uplink (UL) user plane (UP) data in a RRC inactive state of a 5G new radio (NR) system.

FIG. 1(a) illustrates a 4-step random access channel (RACH) based SDT. Here, the UP data may be transmitted in Msg3 of a 4-step RACH procedure. In addition, a small payload may be multiplexed with, for example, an RRC connection resume request.

Figure 1B:
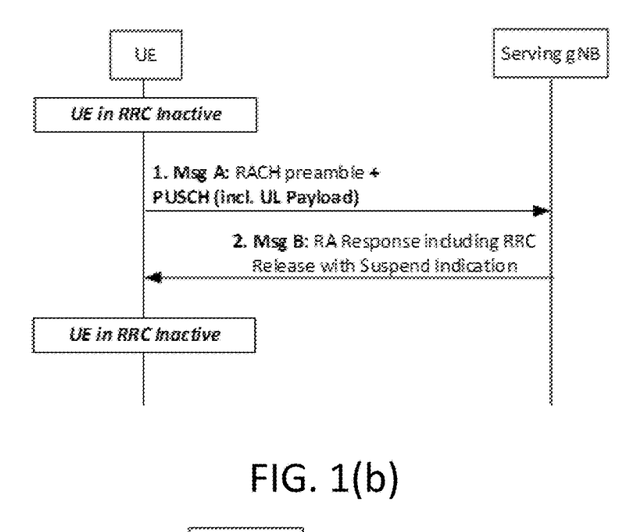
FIG. 1(b) illustrates an example of a 2-step based SDT signaling diagram.

FIG. 1(b) illustrates a 2-step RACH based SDT. In this procedure, the UP data transmission may occur with MsgA of a 2-step RACH procedure, and specifically on the physical uplink shared channel (PUSCH) resources. The PUSCH resources may be pre-configured by the gNB and broadcasted in system information with associated physical transmission parameters.

Figure 1C:
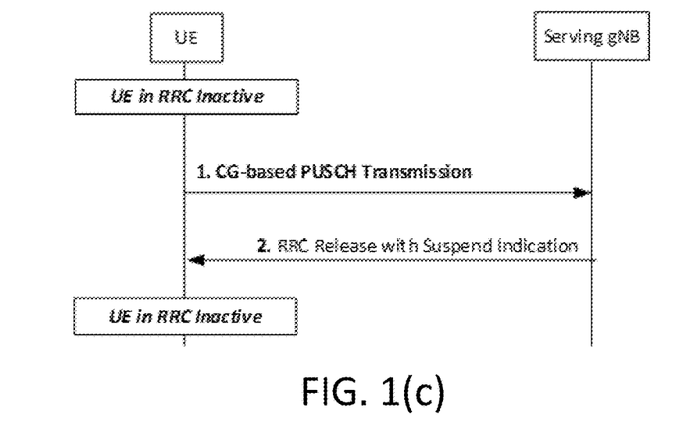
FIG. 1(c) illustrates an example of a configured grant (CG) SDT signaling diagram.

Additionally, FIG. 1(c) illustrates a CG based SDT. Here, a UE in RRC_connected state may receive a CG type1 configuration. According to certain example embodiments, this configuration may indicate the specific pre-configured PUSCH resources to be used for UL data transmission in RRC_inactive state as long as the timing alignment is valid.

Figure 2:
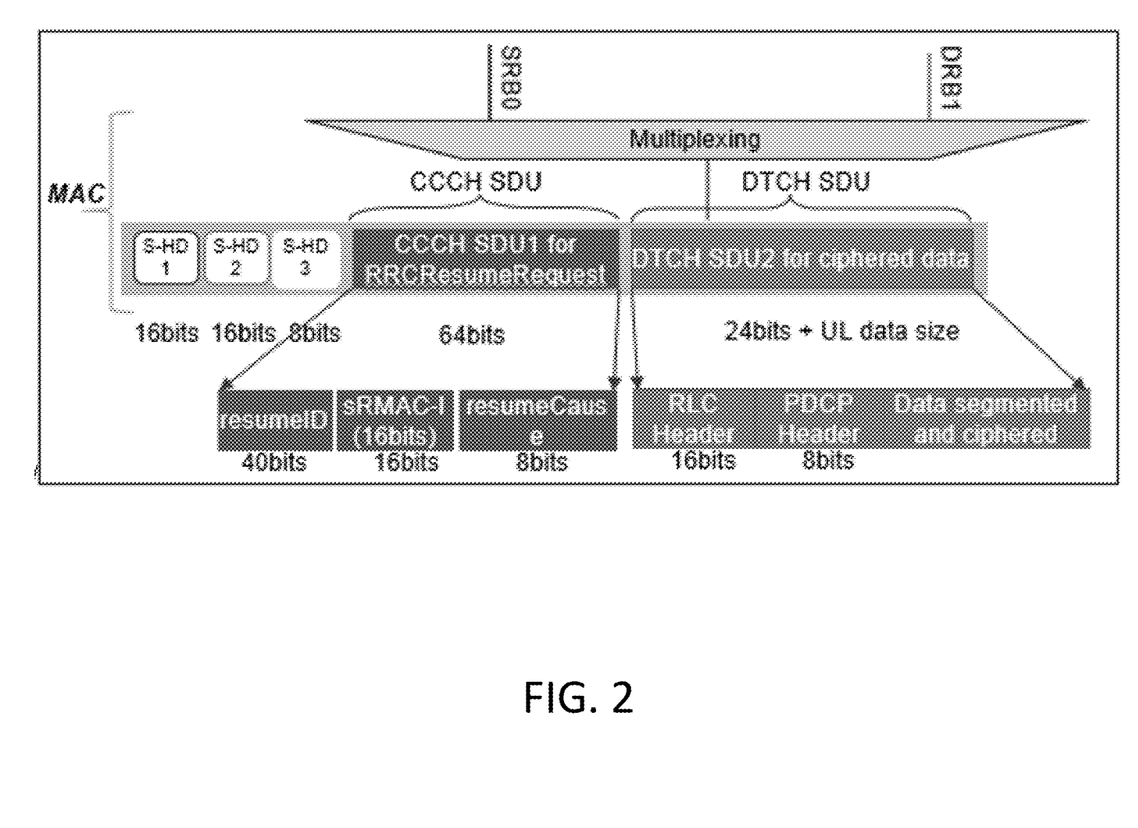
FIG. 2 illustrates an example content of an uplink medium access control protocol data unit.

In certain cases, the RRC-based approach illustrated in FIGS. 1(a)-1(c) may be assumed. For instance, the UE may send an RRC message including information about the UE identity and its authentication token (i.e., MAC-I). In FIGS. 1(a)-1(c), it may be assumed that the RRC resume request message is used for this purpose, and FIG. 2 illustrates an example content corresponding UL MAC protocol data unit (PDU). In a RRC-less approach, it may be assumed that the RRC layer does not need to be involved in SDT operations, and the necessary information, such as UE identity and UE authentication token, may be provided by the UE in the MAC header or as a MAC control element (CE).

3GPP also describes whether to adopt an RRC method or an RRC-less method for SDT. In this regard, 3GPP describes that SDT with RRC message may be supported as a baseline for RA-based and CG-based schemes. Also described is that RRC-less may be applied in limited use cases with low priority including, for example, the same serving cell and/or for CG. In addition, there is consideration around transmission of RRC-based SDT in the case of inter-gNB. For example, the UE may resume in a so-called "target gNB" that is different from the last serving gNB (e.g., anchor gNB). In such a case, two solution variants may be provided. For example, one solution may be with anchor relocation between the old and new gNB, and a second solution may be without anchor relocation between the old and new gNB.

The conventional SDT routing solutions may pose several issues. For example, the SDT routing solutions may incur excessive unnecessary signaling during UE context retrieval and patch switch. In addition, conventional SDT routing solutions may experience unnecessary involvement of the target gNB-central unit (CU)-distributed unit (DU), and have an overloaded target gNB resulting in the UE's data radio bearers (DRBs) being dropped. Further, even if SDT routing without anchor relocation was assumed, the only change would be the absence of a path switch procedure. The rest of the signaling would remain the same. As noted above, 3GPP describes several agreements related to SDT. For instance, SDT with RRC message may be supported as a baseline for RA-based and CG-based schemes. In addition, context fetch and data forwarding may be performed with anchor relocation and without anchor relocation.

Figure 3:
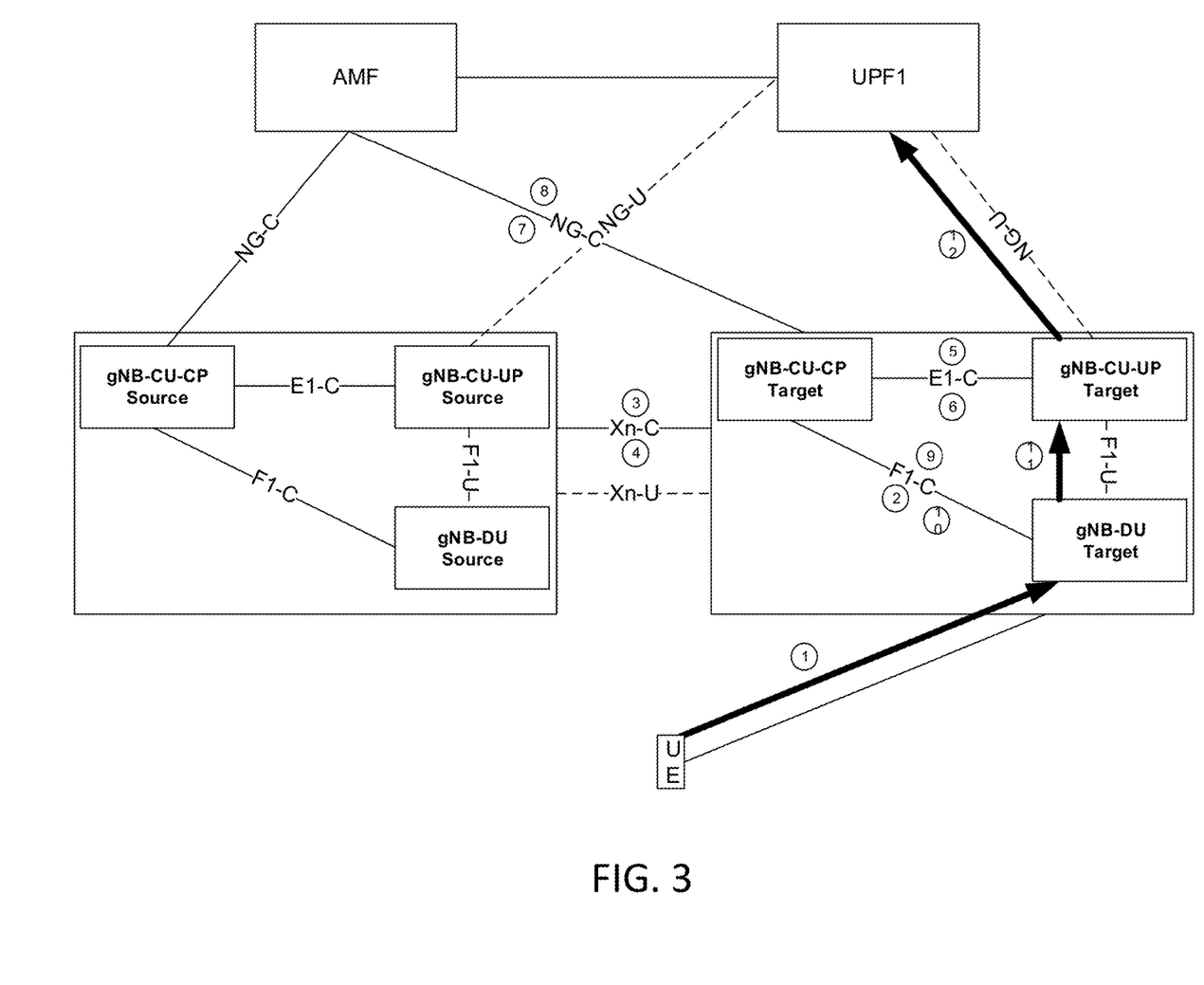
FIG. 3 illustrates an example routing signal diagram for an inter-gNB SDT.

FIG. 3 illustrates an example routing signal diagram for an inter-gNB SDT. At 1, the UE may send an SDT packet to the target gNB-DU, which may be different from the source. The SDT packet may be sent with an RRC resume request message including an I-RNTI. At 2, it may be determined that the target gNB-DU does not have a UE context. As a result, the target gNB-DU may send the RRC resume request message to the target gNB-CU-CP (control plane). At 3, the target gNB-CU-CP may not be able to find the UE context, and may determine the source (old) serving gNB based on the I-RNTI. Here, the target gNB-CU-CP may send an Xn to the source gNB-CU-UP with a UE context retrieve request message. In response to the UE context retrieve request message, at 4, the source gNB-CU-UP may fetch the relevant UE context, and send it to the target gNB-CU-CP. At 5, the target gNB-CU-CP may perform admission control, and establish bearer contexts for all the accepted bearers with the target gNB-CU-UP (E1: bearer context setup). Further, the user plane function (UPF) uplink (UL) tunnel endpoint identifiers (TEIDs) of the protocol data unit (PDU) sessions may be provided to the target gNB-CU-UP.

As further illustrated in FIG. 3, at 6, the target gNB-CU-UP may respond to the target gNB-CU-CP with a E1 bearer context response, which may include the F1 UL TEID for the data radio bearers (DRBs). In addition, at 7, the target gNB-CU-CP may send a NG path switch request to an access and mobility management function (AMF) to switch the TEIDs of the PDU sessions. In addition, the target gNB-CU-UP DL TEID of the PDU sessions may be provided to the AMF. At 8, the AMF may send a path switch request acknowledgement to the target gNB-CU-CP. Further, at 9, the target gNB-CU-CP may trigger the target gNB-DU to perform UL SDT by sending a F1 UE context setup request, which may include the received F1 UL TEID from the gNB-CU-UP.

FIG. 3 also illustrates, at 10, that the target gNB-DU may respond to the F1 UE context setup request. For instance, the F1 DL TEID for the DRBs may be provided. In certain instances, this may be provided to the target gNB-CU-UP for further data transmission in the DL (this additional E1 procedure to update the DL TEID of the DU is not illustrated in FIG. 3). At 11, the target gNB-DU may forward the UL SDT to the target gNB-CU-UP. Finally, at 12, the target gNB-CU-UP may forward the UL SDT packet to the correct UPF.

As described herein, certain example embodiments may provide, for inter-gNB SDT, optimized signaling for routing the SDT packet, and latency reduction. In certain example embodiments, this may be accomplished by providing a shortcut from the target gNB-DU to the source gNB-CU-UP without performing an anchor relocation. As such, in certain example embodiments, the target gNB-CU-CP may send an F1-U transport layer address of the source/old serving gNB-CU-UP to the target DU together with the radio link control (RLC) context received from the source (old) gNB. With this, after RLC processing the payload of the UL SSDT packet is received from the UE, the target DU may transfer the resulting RLC SDU of the UL SDT packet directly to the old CU-UP. Further, the source gNB-CU-UP may perform the packet data convergence protocol (PDCP) processing, and forward the packet UL towards the user plane function (UPF) over NG-U.

Figure 4:
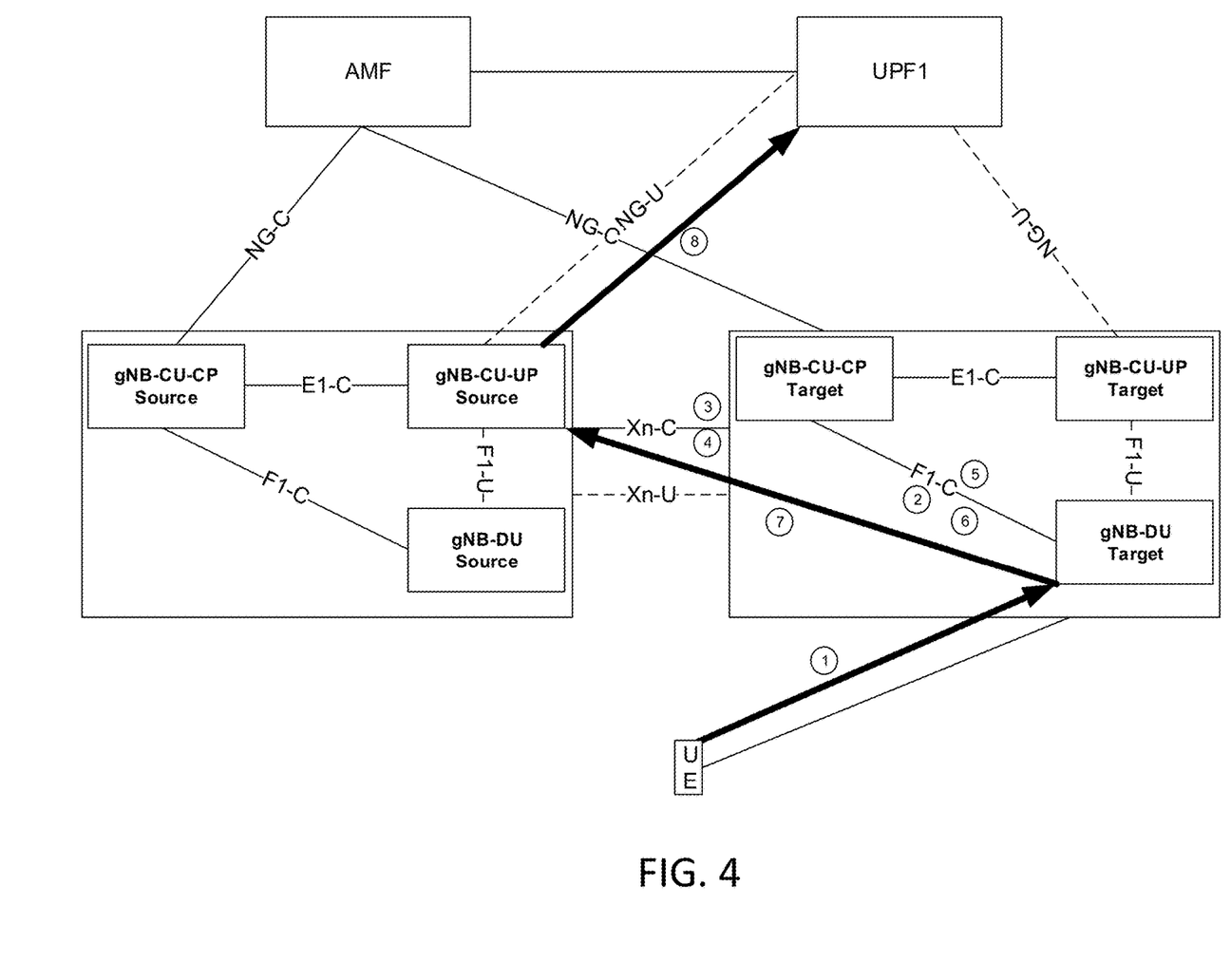
FIG. 4 illustrates a routing signal diagram for an inter-gNB SDT, according to certain example embodiments.

FIG. 4 illustrates a routing signal diagram for an inter-gNB SDT, according to certain example embodiments. According to certain example embodiments, the transport layer address (TLA) may include an IP address and a general packet radio service (GPRS) tunneling protocol (GTP) TEID. At 1 in FIG. 4, the UE may send an SDT packet to the target gNB-DU within an RRC resume request message. In certain example embodiments, the target gNB-DU may be different from the source gNB-DU, and the RRC resume request message may include an I-RNTI. At 2, the gNB-DU may not have the UE context and, thus, may send the RRC resume request message received from the UE to the target gNB-CU-CP. In certain example embodiments, sending the RRC resume request message may be triggered by the receipt of the RRC resume request message from the UE. At 3, the target gNB-CU-CP may not be able to find the UE context, and may determine the source or old-serving gNB based on the I-RNTI. Further, the target gNB-CU-CP may send an Xn UE context retrieve request message to the source gNB-CU-UP. In certain example embodiments, the target gNB-CU-CP may also indicate that it does not intend to relocate the UE context, but instead forward the SDT packet via the source gNB-CU-UP. According to certain example embodiments, this may be accomplished by using an additional information element in the Xn retrieve UE context request message. According to other example embodiments, additionally or alternatively, the target gNB-CU-CP may indicate in the Xn retrieve UE context request message that the retrieval is related to SDT transmission, and it is the source gNB-CU-UP that may decide not to relocate the anchor (source (old) gNB).

At 4, the source gNB-CU-CP may fetch the relevant UE context, and send the relevant context information to the target gNB-CU-CP in the UE context retrieve response or UE context retrieve failure message. According to certain example embodiments, the relevant UE context may include an F1-U TLA of the source (old) gNB-CU-UP together with the stored RLC context of the UE. Further, at 5, the target gNB-CU-CP may trigger the target gNB-DU to perform UL SDT by sending a F1 UE context setup request to the target gNB-DU. In addition, the target gNB-CU-CP may include in the F1 UE context setup request, and the TLA of the source (old) gNB-CU-UP received at step 4 in addition to the RLC context received at step 4. At 6, the target gNB-DU may transmit a F1 UE context setup response to the target gNB-CU-CP. At 7, the target gNB-DU may process the UL SDT packet at the RLC layer using the received RLC context, and may forward the UL SDT directly to the source (old) gNB-CU-UP using the received source (old) gNB-CU-UP TEID. In certain example embodiments, the source (old) gNB-CU-UP TEID may be received by the target gNB-CU-CP in step 4. Additionally, at 8, the source gNB-CU-UP may process the UL SDT data at the PDCP layer, and forward the packet (e.g., the UL SDT data packet) to the correct UPF.

Figure 5:
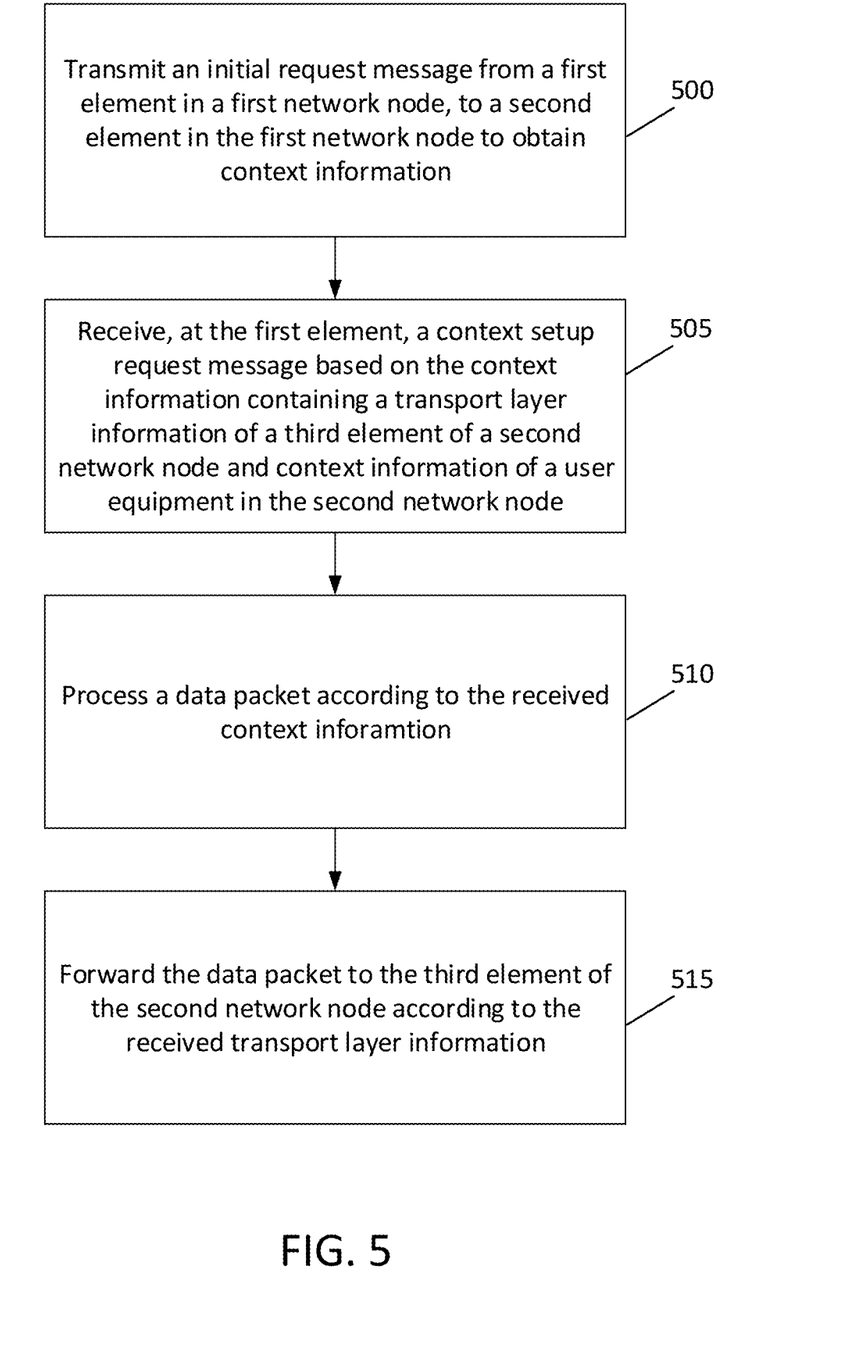
FIG. 5 illustrates a flow diagram of a method, according to certain example embodiments.

FIG. 5 illustrates a flow diagram of a method, according to certain example embodiments. In certain example embodiments, the flow diagram of FIG. 5 may be performed by a network entity or network node in a 3GPP system, such as LTE or 5G-NR. For instance, in an example embodiment, the method of FIG. 5 may be performed by a element of a network node or the network node itself, for instance similar to apparatuses 10 or 20 illustrated in FIGS. 7(a) and 7(b).

According to certain example embodiments, the method of FIG. 7 may include, at 500, transmitting an initial request message from a first element in a first network node, to a second element in the first network node to obtain context information. The method may also include, at 505, receiving, at the first element, a context setup request message based on the context information containing a transport layer information of a third element of a second network node and context information of a user equipment in the second network node. In addition, the method may include, at 510, processing a data packet according to the received context information. Further, the method may include, at 515, forwarding the data packet to the third element of the second network node according to the received transport layer information.

According to certain example embodiments, the transport layer information may include an F1-U transport layer address and/or an F1-U general packet radio service (GPRS) tunneling protocol (GTP) tunnel endpoint. According to other example embodiments, the context information may be a radio link control context of a user equipment stored in the second network node. According to further example embodiments, the data packet may be an uplink small data transmission (SDT) packet.

In certain example embodiments, the initial request message may originate from a user equipment. According to other example embodiments, the method may further include transmitting a response message to the second element in response to receiving the context setup request message. In certain example embodiments, the initial request message may include an inactive radio network temporary identifier. According to further example embodiments, the first element may be a target gNB-distributed unit, the second element may be a target gNB-central unit-control plane, and the third element may be an anchor (source) gNB-central unit-user plane of a user equipment in radio resource control inactive state.

Figure 6:
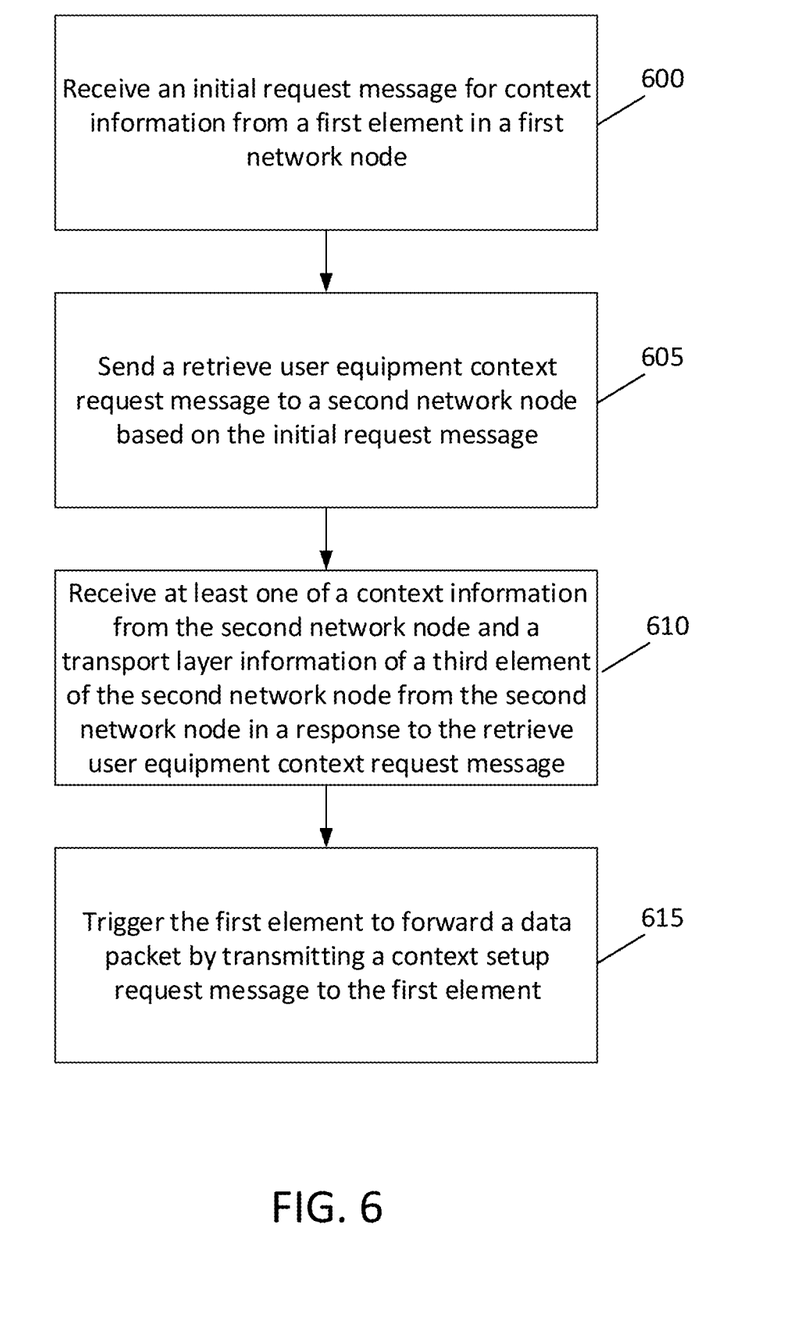
FIG. 6 illustrates a flow diagram of another method, according to certain example embodiments.

FIG. 6 illustrates a flow diagram of another method, according to certain example embodiments. In certain example embodiments, the flow diagram of FIG. 6 may be performed by a telecommunications network, network entity or network node in a 3GPP system, such as LTE or 5G-NR.

Figure 7A:
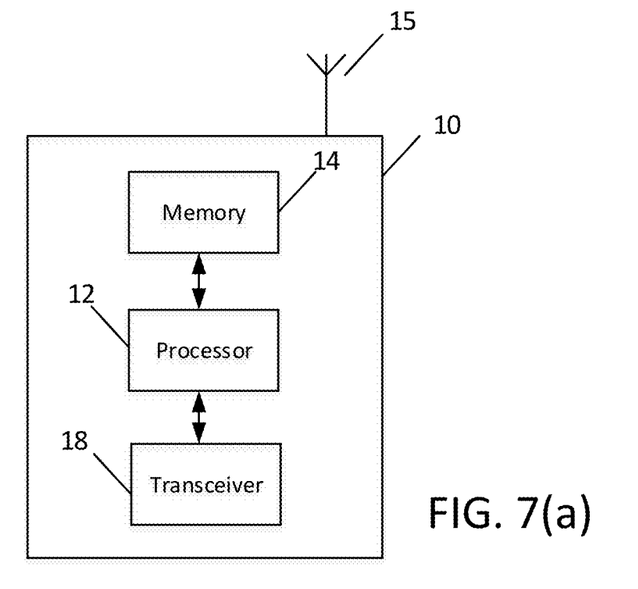
FIG. 7(a) illustrates an apparatus, according to certain example embodiments.
Figure 7B:
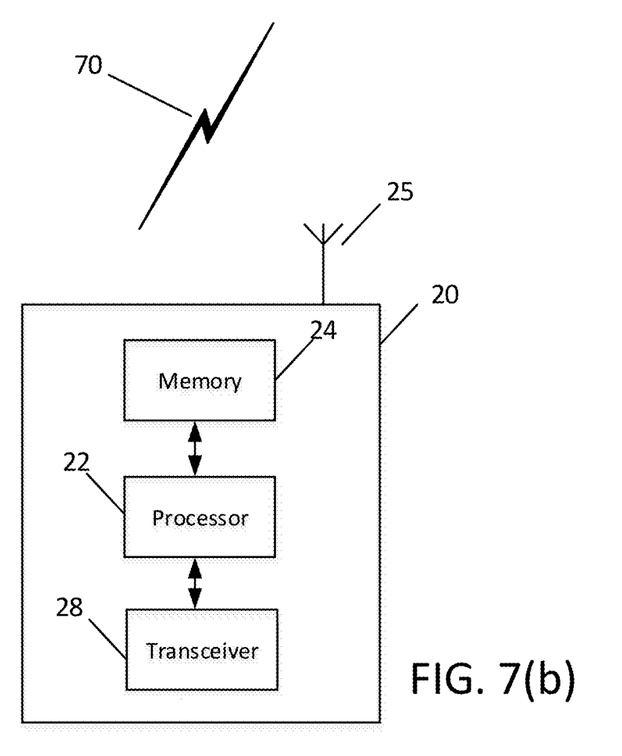
FIG. 7(b) illustrates another apparatus, according to certain example embodiments.

For instance, in an example embodiment, the method of FIG. 6 may be performed by a element of a network node or the network node itself, for instance similar to apparatuses 10 or 20 illustrated in FIGS. 7(a) and 7(b).

According to certain example embodiments, the method of FIG. 6 may include, at 600, receiving an initial request message for context information from a first element in a first network node. The method may also include, at 605, sending a retrieve user equipment context request message to a second network node based on the initial request message. The method may further include, at 610, receiving at least one of a context information stored in the second network node and a transport layer information of a third element of the second network node from the second network node in response to the retrieve user equipment context request message. In addition, the method may include, at 615, triggering the first element to forward a data packet by transmitting a context setup request message to the first element.

According to certain example embodiments, the data packet may be an uplink small data transmission (SDT) packet. According to other example embodiments, the response to the retrieve user equipment context request message may be one of a retrieve user equipment context response message or a retrieve user equipment context failure message. According to further example embodiments, the method may also include receiving a response message from the first element based on sending the context setup request. In certain example embodiments, the method may further include determining the second network node based on an identifier contained in the initial request message.

In some example embodiments, the identifier may be an inactive radio network temporary identifier. In further example embodiments, the sending the retrieve user equipment context request message to the second network node may include indicating that a second element of the first network node does not intend to relocate an anchor function, but forward the data packet via the second network node. According to certain example embodiments, the sending the retrieve user equipment context request message to the second network node may include indicating in the retrieve user equipment context request message that retrieval of the context information is related to SDT, and that the second network node decides not to relocate the anchor function.

According to other example embodiments, the transport layer information may include an F1-U transport layer address and/or a general packet radio service (GPRS) tunneling protocol (GTP) tunnel endpoint of the third entity of the second network node. In certain example embodiments, the context information may include a radio link control context of a user equipment stored in the second network node. In other example embodiments, the context setup request message may include the transport layer information of the third element of the second network node, and the context information received from the second network node in a response to the retrieve user equipment context request message. According to certain example embodiments, the first element may be a target gNB-distributed unit, the second element may be a target gNB-central unit-control plane, and the third element may be an anchor (source) gNB-central unit-user plane of a user equipment in radio resource control inactive state.

FIG. 7(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 7(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7(a).

As illustrated in the example of FIG. 7(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein.

FIG. 7(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), WLAN access point, and/or a network element in the gNB, associated with a radio access network (RAN), such as an LTE network, 5G or NR. It should be noted that one of ordinary skill in the art would understand that apparatus 20 may include components or features not shown in FIG. 7(b)

As illustrated in the example of FIG. 7(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

As discussed above, according to certain example embodiments, apparatus 20 may be a communication network, for example. According to certain embodiments, apparatus 20 may be controlled by memory 14 and processor 12 to perform the functions associated with example embodiments described herein. For instance, in certain example embodiments, apparatus 20 may be controlled by memory 24 and processor 22 to transmit an initial request message from a first element in a first network node, to a second element in the first network node to obtain context information. Apparatus 20 may also be controlled by memory 24 and processor 22 to receive, at the first element, a context setup request message based on the context information containing a transport layer information of a third element of a second network node and context information of a user equipment in the second network node. Apparatus 20 may further be controlled by memory 24 and processor 22 to process a data packet according to the received context information. Apparatus 20 may also be controlled by memory 24 and processor 22 to forward the data packet to the third element of the second network node according to the received transport layer information.

According to other example embodiments, apparatus 20 may be controlled by memory 24 and processor 22 to receive an initial request message for context information from a first element in a first network node. Apparatus 20 may also be controlled by memory 24 and processor 22 to send a retrieve user equipment context request message to a second network node based on the initial request message. Apparatus 20 may further be controlled by memory 24 and processor 22 to receive at least one of a context information stored in the second network node and a transport layer information of a third element of the second network node from the second network node in a response to the retrieve user equipment context request message. In addition, apparatus 20 may be controlled by memory 24 and processor 22 to trigger the first element to forward a data packet by transmitting a context setup request message to the first element.

Further example embodiments may provide means for performing any of the functions or procedures described herein. For example, certain example embodiments may be directed to an apparatus that includes means for transmitting an initial request message from a first element in the apparatus, to a second element in the apparatus to obtain context information. The apparatus may also include means for receiving, at the first element, a context setup request message based on the context information containing a transport layer information of a third element of a second network node and context information of a user equipment in the second network node. The apparatus may further include means for processing a data packet according to the received context information. The apparatus may also include means for forwarding the data packet to the third element of the second network node according to the received transport layer information.

Other example embodiments may be directed to a further apparatus that includes means for receiving an initial request message for context information from a first element in a first network node. The apparatus may also include means for sending a retrieve user equipment context request message to a second network node based on the initial request message. The apparatus may further include means for receiving at least one of a context information stored in the second network node and a transport layer information of a third element of the second network node from the second network node in a response to the retrieve user equipment context request message. In addition, the apparatus may include means for triggering the first element to forward a data packet by transmitting a context setup request message to the first element.

Certain example embodiments described herein provide several technical improvements, enhancements, and/or advantages. In some example embodiments, it may be possible to provide an optimized signaling for routing SDT packet(s). In other example embodiments, it may be possible to provide signaling benefits, and reduce latency by providing a shortcut from the target gNB-DU to the source gNB-CU-UP without performing anchor relocation. Furthermore, it is not necessary to involve the target gNB-CU-UP not on an F1-U tunnel between the target gNB-DU and the target gNB-CU-UP, and the associated signaling. Moreover, certain example embodiments provide an efficient and optimized solution for the transfer of UL SDT inter-gNB scenario where there is no anchor relocation.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

5GS 5G System
AMF Access and Mobility Management Function
CP Control Plane
eNB Enhanced Node B
gNB 5G or Next Generation NodeB
I-RNTI Inactive Radio Network Temporary Identifier
LTE Long Term Evolution
NCC nextHopChainingCount
NG-RAN Next Generation—Radio Access Network
NR New Radio
PDU Protocol Data Unit
RAN Radio Access Network
RNA RAN Notification Area
RNAU RAN Notification Area Update
RRC Radio Resource Control
SDT Small Data Transmission
UE User Equipment
UP User Plane
Xn Xn Network Interface

The invention claimed is:

1. A method, comprising:
    transmitting an initial request message from a first element in a first network node, to a second element in the first network node to obtain context information;
    receiving, at the first element from the second element, a context setup request message comprising a transport layer information of a third element of a second network node and context information of a user equipment stored in the second network node;
    processing a data packet according to the received context information; and
    forwarding the data packet to the third element of the second network node according to the received transport layer information.

2. The method according to claim 1, wherein the transport layer information comprises at least one of an F1-U transport layer address and an F1-U general packet radio service tunneling protocol tunnel endpoint.

3. The method according to claim 1, wherein the context information is a radio link control context of the user equipment stored in the second network node.

4. The method according to claim 1, wherein the data packet is an uplink small data transmission packet.

5. The method according to claim 1, wherein the initial request message originates from the user equipment.

6. The method according to claim 1, further comprising transmitting a response message to the second element in response to receiving the context setup request message.

7. The method according to claim 1, wherein the initial request message comprises an inactive radio network temporary identifier.

8. The method according to claim 1,
    wherein the first element is a target base station distributed unit,
    wherein the second element is a control plane of a target base station central unit, and
    wherein the third element is a user plane of an anchor or source base station central unit.

9. An apparatus, comprising:
    at least one processor; and
    at least one memory comprising computer program code,
    the at least one memory and computer program code are configured, with the at least one processor, to cause the apparatus at least to:
    transmit an initial request message from a first element in the apparatus, to a second element in the apparatus to obtain context information;
    receive, at the first element from the second element, a context setup request message comprising a transport layer information of a third element of a second network node and context information of a user equipment stored in the second network node;

process a data packet according to the received context information; and forward the data packet to the third element of the second network node according to the received transport layer information.

10. The apparatus according to claim 9, wherein the transport layer information comprises at least one of an F1-U transport layer address and an F1-U general packet radio service tunneling protocol tunnel endpoint.

11. The apparatus according to claim 9, wherein the context information is a radio link control context of the user equipment stored in the second network node.

12. The apparatus according to claim 9, wherein the data packet is an uplink small data transmission packet.

13. The apparatus according to claim 9, wherein the initial request message originates from the user equipment.

14. The apparatus according to claim 9, wherein the apparatus is further caused to transmit a response message to the second element in response to receiving the context setup request message.

15. The apparatus according to claim 9, wherein the initial request message comprises an inactive radio network temporary identifier.

16. The apparatus according to claim 9,
wherein the first element is a target base station distributed unit,
wherein the second element is a control plane of a target base station central unit, and
wherein the third element is a user plane of an anchor or source base station central unit.

17. An apparatus, comprising:
at least one processor; and
at least one memory comprising computer program code,
the at least one memory and computer program code are configured, with the at least one processor, to cause the apparatus at least to:
receive a retrieve user equipment context request message from a second element of a first network node;
send a response message comprising a context information of a user equipment stored in the apparatus and a transport layer information of a third element of the apparatus, to enable the user equipment to send one or more data packets to the apparatus based on the context information and the transport layer information; and
receive the one or more data packets from the user equipment.

18. The apparatus according to claim 17, wherein the transport layer information comprises at least one of an F1-U transport layer address and an F1-U general packet radio service tunneling protocol tunnel endpoint.

19. The apparatus according to claim 17, wherein the context information is a radio link control context of the user equipment.

20. The apparatus according to claim 17, wherein the response message is one of a retrieve user equipment context response message or a retrieve user equipment context failure message.

* * * * *